(12) United States Patent
Zhang et al.

(10) Patent No.: US 7,899,654 B2
(45) Date of Patent: *Mar. 1, 2011

(54) HYBRID FRONT TRACKING ALGORITHM FOR SOLVING SINGLE PHASE FLUID EQUATIONS WITH A MOVING BOUNDARY ON A QUADRILATERAL GRID

(75) Inventors: Jie Zhang, Santa Clara, CA (US); Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 413 days.

This patent is subject to a terminal disclaimer.

(21) Appl. No.: 12/043,867

(22) Filed: Mar. 6, 2008

(65) Prior Publication Data

US 2009/0228258 A1    Sep. 10, 2009

(51) Int. Cl.
  *G06F 17/50* (2006.01)
  *G06F 13/00* (2006.01)
(52) U.S. Cl. ............... 703/2; 703/9; 347/65; 708/48 Q; 208/100; 208/106
(58) Field of Classification Search ............ 703/2, 703/9; 208/48 Q, 100, 106; 347/65
  See application file for complete search history.

(56) References Cited

U.S. PATENT DOCUMENTS

| | | |
|---|---|---|
| 6,271,856 B1 | 8/2001 | Krishnamurthy |
| 6,574,650 B1 | 6/2003 | Aoki |
| 6,906,458 B2 | 6/2005 | Kobayashi |

(Continued)

FOREIGN PATENT DOCUMENTS

EP    0980048 B1    10/2003

(Continued)

OTHER PUBLICATIONS

J. A. Sethian, "Level Set Methods and Fast Marching Methods," Cambridge University Press, New York, N.Y., Jan. 1999, p. 9.

(Continued)

*Primary Examiner*—Thai Phan (57) ABSTRACT

A computer implemented method for simulating a final pattern of a droplet of a fluid having a plurality of fluid properties is disclosed. The method includes representing a position of a moving fluid boundary at a first point in time with a plurality of fluid markers, wherein the moving fluid boundary provides a boundary for a single-phase fluid. The moving fluid boundary separates a simulation space into a fluid space and a vacuum space, and the single-phase fluid inhabits the fluid space. The method further includes evaluating a plurality of indicator function defined on a quadrilateral grid for a velocity field, a pressure, and the plurality of fluid markers. The quadrilateral grid is formed by a plurality of points inside the fluid space and the vacuum space. The method also includes calculating surface tension at the moving fluid boundary through a level set method, solving a plurality of flow equations through a projection method for a surface location on the boundary, and representing the position of the moving fluid boundary at a second point in time by updating the positions of the fluid markers based on the plurality of velocity values. The fluid properties and the shape of the final pattern is then stored on a computer readable media.

21 Claims, 7 Drawing Sheets

U.S. PATENT DOCUMENTS

| | | | |
|---|---|---|---|
| 7,006,088 | B1 | 2/2006 | Guskov et al. |
| 7,117,138 | B2 | 10/2006 | Yu et al. |
| 2002/0046014 | A1 | 4/2002 | Kennon |
| 2004/0181383 | A1 | 9/2004 | Yu et al. |
| 2004/0181384 | A1 | 9/2004 | Yu |
| 2005/0243117 | A1 | 11/2005 | Yu |
| 2006/0000081 | A1 | 1/2006 | Kondo |
| 2006/0044506 | A1 | 3/2006 | Kida et al. |
| 2007/0051958 | A1 | 3/2007 | Yamazaki et al. |
| 2007/0073527 | A1 | 3/2007 | Flandrin et al. |
| 2007/0109606 | A1 | 5/2007 | Nagae |
| 2007/0136042 | A1 | 6/2007 | Yu |

FOREIGN PATENT DOCUMENTS

| | | |
|---|---|---|
| JP | 2003-186918 | 7/2003 |
| JP | 2006-318481 | 11/2006 |

OTHER PUBLICATIONS

G. Tryggvason, et al., "A Front Tracking Method for the Computations of Multiphase Flow", Feb. 2001, pp. 1-58.

Osher, S., et al., "Level Set Methods", Feb. 25, 2000, pp. 1-61.

Tryggvason, G., et al., "A Front-Tracking Method for the Computations of Multiphase Flow", Journal of Computational Physics 169, Jan. 5, 2001, pp. 708-759.

Osher, S., et al., "Fronts Propagating with Curvature Dependent Speed: Algorithms Based on Hamilton-Jacobi Formulations", Journal of Computational Physics, 79, pp. 12-49, Jan. 1988.

Osher, S., et al., "Level Set Methods: An Overview and Some Recent Results", Sep. 5, 2000, pp. 1-65.

Di, et al., "Level Set Calculations for Incompressible Two-Phase Flows on a Dynamically Adaptive Grid", Oct. 10, 2006, pp. 1-24.

HYBRID FRONT TRACKING ALGORITHM FOR SOLVING SINGLE PHASE FLUID EQUATIONS WITH A MOVING BOUNDARY ON A QUADRILATERAL GRID

CROSS REFERENCE TO RELATED APPLICATIONS

This Application is related to application Ser. No. 11/777,076 entitled "A hybrid method for enforcing curvature related boundary conditions in solving one-phase fluid flow over a deformable domain," filed on Jul. 12, 2007. This application is herein incorporated by reference in its entirety for all purposes.

BACKGROUND

Inkjet technology is traditionally used in a general home/office printing uses. In order to increase the resolution and to explore further uses of the inkjet technology, it is important to know how the fluid droplet from the inkjet head will finally settle when they dry.

The present invention is directed towards the study of single-phase fluids. A single-phase fluid, as used in the present invention refers to a pure fluid or a mixture. A boundary encapsulates this single-phase fluid, and over time the boundary may evolve and move through space. The solution or fluid domain is restricted to an area delimited by the boundary. For the purposes of the present invention, the effect of an interface, if any that does form between elements of such a mixture may be ignored when considering the motion of the boundary.

Motion of the boundary may be governed by one or more equations. The boundary may be defined by a set of markers. For some systems the equations may include terms related to the curvature of the boundary. Prior art methods have calculated the curvature of the boundary from a cubic spline fitted to the markers that define the boundary. Small errors in the positions of the marker can cause errors in the second derivatives, which can create variations in the curvature. Under certain conditions, this variation may increase in magnitude as the boundary evolves in time. This can lead to numerically unstable simulations, which exhibit unrealistic oscillations.

Prior art methods have attempted to address the problems that arise from defining the boundary using markers by employing multi-phase fluid simulation methods (e.g., front tracking methods).

Problems may arise when handling the boundary between the two fluids. Each fluid is characterized by a set of system variables (i.e., density, viscosity, and pressure). A jump condition necessarily exists at the boundary. This jump condition is represented by a step wise change in the system variables and results in a discontinuity in system variables and their derivatives at the boundary. This discontinuity can prevent numerical solutions from converging. Further, to accommodate the complex geometry, a quadrilateral grid is needed to be set aligned with the geometry of the bank structure.

SUMMARY

An embodiment of the present invention may be a system or method for simulating the flow of single-phase fluid flow. Markers represent a moving fluid boundary of the single-phase fluid at a first point in time. The moving fluid boundary separates a simulation space into a fluid space and a vacuum space. The single-phase fluid inhabits the fluid space. A signed distance function is evaluated at points surrounding the moving fluid boundary based upon markers. The curvature of the boundary is evaluated near the markers in the vacuum space based on the signed distance function. The velocity of the fluid and pressure jump conditions are calculated based upon the curvature of the boundary. The position of the markers is updated at a second point in time based on the velocity of the fluid.

In one embodiment, a computer implemented method for simulating a final pattern of a droplet of a fluid having a plurality of fluid properties is disclosed. The method includes representing a position of a moving fluid boundary at a first point in time with a plurality of fluid markers, wherein the moving fluid boundary provides a boundary for a single-phase fluid. The moving fluid boundary separates a simulation space into a fluid space and a vacuum space, and the single-phase fluid inhabits the fluid space. The method further includes evaluating a plurality of indicator functions defined on a quadrilateral grid for a velocity field, a pressure, and the plurality of fluid markers. The quadrilateral grid is formed by a plurality of points inside the fluid space and the vacuum space. The method also includes calculating surface tension at the moving fluid boundary through a level set method, solving a plurality of flow equations through a projection method, and representing the position of the moving fluid boundary at a second point in time by updating the positions of the fluid markers based on the plurality of velocity values. The fluid properties and the shape of the final pattern is then stored on a computer readable media.

In another embodiment, a system for simulating a final pattern of a droplet of a fluid is disclosed. The system includes a computer readable media to provide storage for programming instructions. The programming instructions including programming instructions to implement an indicator function evaluation module, a fluid boundary monitor module, a flow equation solver module, and a fluid properties display and storage module. A processor coupled to the computer readable media to execute the programming instructions is also included. A display is provided to plot the final pattern of the droplet and a plurality of fluid properties of the fluid. The fluid boundary monitor module marks a moving fluid boundary of the droplet. The indicator function evaluation module solves a plurality of indicator functions defined on a quadrilateral grid for a velocity field, a pressure, and the plurality of fluid markers. The flow equation solver module solves a plurality of flow equations through a projection method for a surface location on a fluid boundary of the droplet.

In yet another embodiment, a computer readable media having program instructions for simulating a final pattern of a droplet of a fluid having a plurality of fluid properties is provided. The computer readable media includes program instructions for representing a position of a moving fluid boundary at a first point in time with a plurality of fluid markers. The moving fluid boundary provides a boundary for a single-phase fluid. The moving fluid boundary separates a simulation space into a fluid space and a vacuum space, and the single-phase fluid inhabits the fluid space. Program instructions for evaluating a plurality of indicator functions defined on a quadrilateral grid for a velocity field, a pressure, and the plurality of fluid markers, are also provided. The quadrilateral grid is formed by a plurality of points inside the fluid space and the vacuum space. Further, program instructions for calculating surface tension at the moving fluid boundary through a level set method are provided. The computer readable media further includes program instructions for solving a plurality of flow equations through a projection method, program instructions for representing the position of the moving fluid boundary at a second point in time by updating the positions of the fluid markers based on the plurality of velocity values, and program instructions for storing the plurality of fluid properties and a shape of the final pattern on a computer readable media.

The advantages of the embodiments of the present invention are numerous. Most notably, since the embodiment of the present invention uses a quadrilateral grid for computation of various properties such as pressure and velocity, the simulation is realistic. In real life applications, the droplet is located in a more complex bank structure. To accommodate the complex geometry, a more complicated quadrilateral grid is needed to be set aligned with the geometry of the bank structure.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention can be best understood by reference to the following description taken in conjunction with the accompanying figures, in which like parts may be referred to by like numerals.

The figures are provided in order to provide a thorough understanding of the present invention. The figures should not be construed as limiting the breath of the invention in any manner.

DETAILED DESCRIPTION

The present invention relates to systems and methods for simulating a single-phase fluid flow enclosed by a deformable boundary while enforcing curvature related boundary and pressure jump conditions. The solution or fluid domain is restricted to an area delimited by the boundary. Further, the present invention is directed towards creating numerically stable simulations.

Inkjet technology is conventionally used printing applications such as printing on papers, etc. However, tremendous amount of resources can be saved by applying the inkjet technology in industrial printing process. For example, the inkjet technology can be used in semiconductor fabrication, fabricating Liquid Crystal Display (LCD), Thin film transistors (TFT), Organic light emitting diode (OLED) devices, solar cells, etc.

In the inkjet printing process, small droplets containing the solute of desired properties are deposited to the target area. After the droplets reaching the targeted area, the solvent evaporates and only the solute is left forming a final print pattern. The final pattern of the solute deposit directly determines the desired product quality.

In order to achieve a better quality of the final product, it is important to understand how the final pattern is formed in realistic environment. Embodiments of the present invention provide simulating the final pattern for a given solute in a given solvent under certain conditions such as pressure, the structure on which the droplets would rest, etc.

It can be challenging work to solve single-phase fluid flow problems in which the boundary conditions include time dependent deformable domains (e.g., a moving surface). Generally, only a few specific cases with a time dependent domain can be solved analytically. Most of the solutions to such problems can only be obtained through numerical methods.

Since the boundary of the domain is evolving with time, a time dependent solution needs to be calculated. This adds a further level of complexity to the numerical solution. The boundary conditions of such a problem may involve curvature related terms. How to treat these boundary conditions correctly in the numerical algorithm directly affects the accuracy and numerical stability of the numerical solution. With this overview in mind, the following figures will illustrate examples, structures, and functionality of methods and systems for simulating a final pattern of a droplet.

Figure 1:
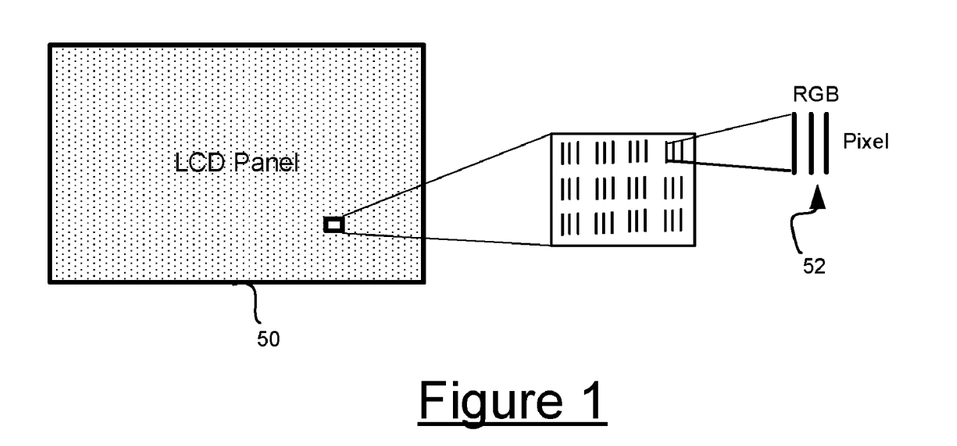
FIG. 1 illustrates an exemplary use of the inkjet printing technology in the fabrication of Liquid Crystal Displays, in accordance with one embodiment of the present invention.

FIG. 1 illustrates an exemplary application of the use of inkjet printing technology in industrial printing. In one embodiment, the inkjet technology can be used for fabrication of liquid crystal display (LCD) devices 50. Traditionally, LCDs 50 are fabricated using CMOS fabrication technology which requires several processing steps such as masking, unmasking, etc., to fabricated Red (R), Green (G), and Blue (B) pixels 52 on a non-uniform surface. With the use of the inkjet technology, the RGB pixels can be printed on the surface in one step. As well known, the inkjet technology uses small droplets of a fluid for printing. The inkjet printing head deposits small droplets in a desired pattern on the surface. Until the drops dry, shapes of these drops change continuously due to fluid evaporation, surface tension, fluid properties of the fluid, and properties of the surface, etc. Therefore, the final pattern of the drops may change into a shape and size that may not be desirable. For example, in the LCD fabrication example, if droplets for R and G are printed too far away from each other, a lower LCD resolution will result. However, if these droplets are places too close, the drops may overlap when dried. Therefore, it is important to simulate the final pattern of a drop for a better design of the devices. In one embodiment, the simulation of the final shape of the droplet can be repeated several times by adjusting the fluid properties of the droplet until a desired final shape is obtained. It should be noted that FIG. 1 simply illustrates one of many uses of the inkjet technology in industrial applications. Many other applications are possible if a time dependent shape of the droplet on a complex bank structure can be simulated.

Figure 2:
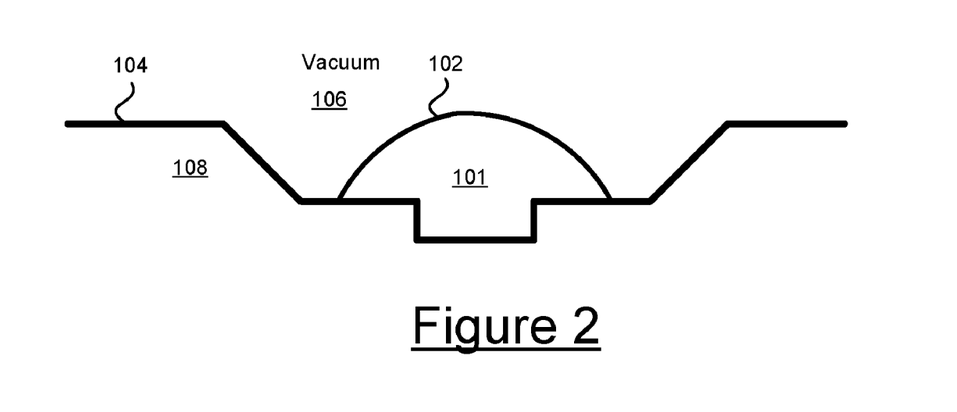
FIG. 2 illustrates a droplet on a non-uniform surface, in accordance with one embodiment of the present invention.

FIG. 2 illustrates a droplet of a single phase fluid on a complex bank structure surface 108. A liquid 101 forms a drop on a substrate 108 in a vacuum 106. The simulation boundary consists of a fixed boundary 104 and a deformable boundary 102. The fixed boundary 104 separates the liquid 101 from the substrate 108 while deformable boundary 102 separates the liquid 101 from the vacuum 106. In the present invention, the deformable boundary 102 of the domain is represented by a set of markers.

In order to achieve a better quality of the final product, it is important to understand how the final pattern of the droplet is formed in a realistic environment and the major factors affecting the final pattern of the droplet. Further, it is also important to understand as to how to control the fluid properties and other parameters that affect the final pattern to achieve the desired pattern. Although simulations in a rectangular domain provide some insights into achieving a desired final pattern, in a realistic setup, the droplet is located in a more complex bank structure 104. To accommodate the complex geometry, a quadrilateral grid is needed to be set aligned with the geometry of the bank structure 104.

In one embodiment, a hybrid method is used for enforcing the curvature related boundary conditions for solving a single phase fluid flow problem on a quadrilateral grid. In this method, the computational grid is assumed to be quadrilateral for both finite difference and finite element methods. The number of nodes that needs to be solved vary due to the change in computational domain over time. The boundary of the domain is explicitly tracked by a number of marker points on the fluid surface. The marker points move with respect to the background quadrilateral grid. Further, the pressure jump condition is enforced along this moving boundary.

Governing Equations

The liquid drop of an incompressible fluid sits on a substrate surface with two contact points. In one embodiment the liquid drop has a low Reynolds number, i.e., the ratio of inertial forces to viscous forces. In this embodiment, the creeping flow equation (1A) is solved with incompressibility condition (1B) enforced. The creeping flow equation (1A) and the incompressibility condition (1B) may be considered the governing equations for this problem.

$$\rho \frac{\partial u}{\partial t} = -\nabla p + \mu \nabla^2 u \quad (1A)$$

$$\nabla \cdot u = 0 \quad (1B)$$

In the equation (1A), $\rho$ is the density, u is the velocity, t is the time, p is the pressure, and $\mu$ is the dynamic viscosity. In one embodiment, it is assumed that the drop meets with outside vacuum and that the pressure in vacuum is zero. The boundary condition along the liquid-vacuum surface is:

$$p = \sigma \kappa \quad (2)$$

In equation (2), p is the pressure inside the fluid, $\sigma$ is the surface tension on the surface of the drop, and $\kappa$ is the curvature of the surface. In this embodiment, a projection method is utilized to solve equations (1A), (1B), and equation (2).

Since a quadrilateral grid is being used, equation (1A) is transformed from physical space X=(x, y) to transformed space $\Xi=(\xi,\eta)$. The governing equation (1A and 1B) changes to:

$$\rho \frac{\partial u}{\partial t} = -\frac{1}{J} T^T \nabla_\Xi p + \frac{\mu}{J} \nabla_\Xi \cdot \left[ \frac{1}{J} T T^T \nabla_\Xi u \right], \quad (3A)$$

$$\nabla_\Xi \cdot (Tu) = 0. \quad (3B)$$

In equation (3A), T is the transformation matrix and J is the Jacobian. The Jacobian depends of the cell being referred to, in the quadrilateral grid. J and T are solved by the following equation (4):

$$J = \det\begin{pmatrix} x_\xi & x_\eta \\ y_\xi & y_\eta \end{pmatrix}, T = \begin{pmatrix} y_\eta & -x_\eta \\ -y_\xi & x_\xi \end{pmatrix}. \quad (4)$$

Equation (4) is used to solve the governing equations in a transformed space.

Numerical Algorithm

In one embodiment, a numerical procedure for solving single-phase incompressible fluid 101 problems with a deformable boundary 102 (i.e. time dependent deformable solution domain) may use markers to track the boundary. The numerical procedure may include deriving indicator functions defined on a quadrilateral grid to solve for a velocity field, a pressure field, and the marker positions. The numerical procedure may also include deforming the boundary 102 if there are velocity boundary conditions on the boundary or for other reasons. The numerical procedure further includes calculating the surface tension term at the boundary 102 using a level set approach. It may be noted that the method of calculating surface tension term using the level set method is disclosed in the U.S. patent application Ser. No. 11/777,076, which is incorporated herein by reference, hence, the details of such calculations are being omitted.

Figure 3A:
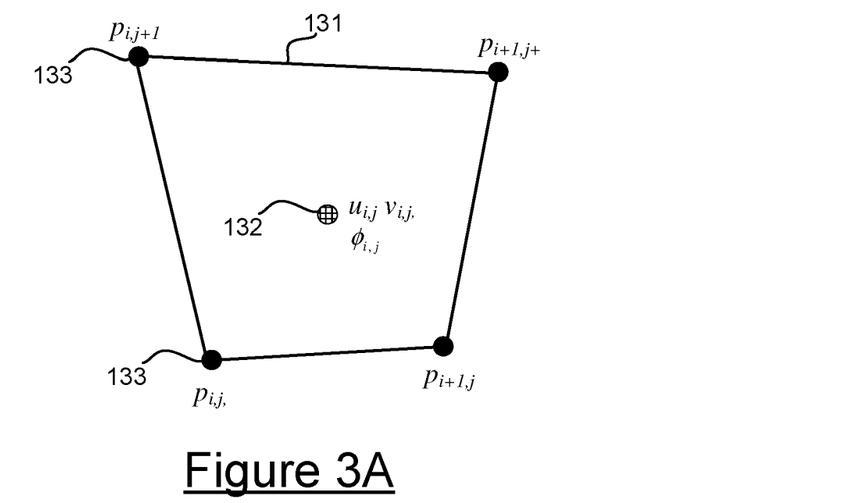
FIG. 3A illustrates an exemplary quadrilateral grid layout, in accordance with one embodiment of the present invention.
Figure 3B:
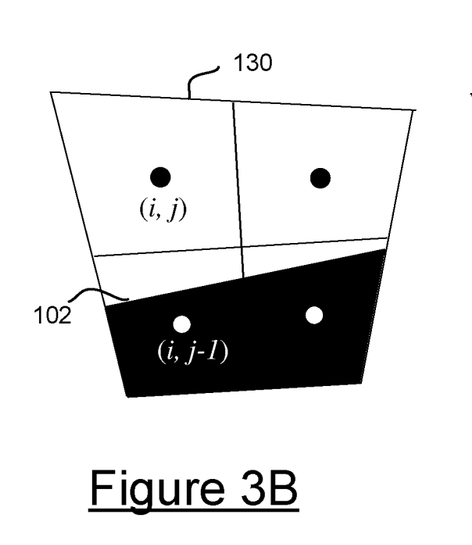
FIG. 3B and FIG. 3C illustrate exemplary quadrilateral grids and portions of the droplet to evaluate velocities extrapolations, in accordance with one embodiment of the present invention.
Figure 3C:
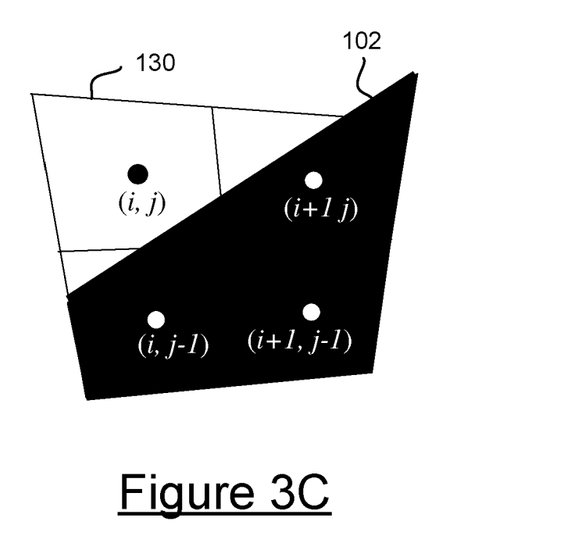

Further, the numerical procedure also includes using a projection method to solve a set of flow equations given a particular location of the deformable boundary 102. Because the fluid properties are unknown outside the fluid domain, to solve the flow equations, the velocity field at a time step is extrapolated to grid locations near but outside the surface or boundary 102. FIG. 3A illustrates a cell 131 of the quadrilateral grid. The velocities and level set values are defined at cell centers 132. Pressure and curvature values are defined at the grid points 133. Referring now to FIG. 3B and FIG. 3C, if a point $(x,y)_{i,j}$ at which the velocity is unknown and needs to be determined is outside the computational domain (i.e., outside the boundary 102), the velocity at point $(x,y)_{i,j}$ can be determined by applying one of the following rules. If one of the points that is adjacent to point $(x,y)_{i,j}$ in the quadrilateral grid 130 is inside the fluid domain, then the velocity at point $(x,y)_{i,j}$ is set to equal the velocity at the adjacent point in the fluid domain. Hence, as illustrated in FIG. 3B, the velocity at point $(x,y)_{i,j}$ will be set equal to the velocity at point $(x,y)_{i,j-1}$ because point $(x,y)_{i,j-1}$ is adjacent to point $(x,y)_{i,j}$ and also point $(x,y)_{i,j-1}$ is inside the fluid domain.

Referring now to FIG. 3B. If three points that are adjacent to point $(x,y)_{i,j}$ are in the fluid domain (i.e., inside the fluid, hence, the velocities at these points are known), the velocity at point $(x,y)_{i,j}$ (i.e., point four in the calculations below) can be calculated by extrapolation. Assuming the coordinates of the points in three dimension are $(x_i, y_i, z_i)$, where i=1, 2, 3, and 4 (representing four points in question). Since passing through any three points, a plane can be determined using equation (5):

$$\begin{vmatrix} x-x_1 & y-y_1 & z-z_1 \\ x-x_2 & y-y_2 & z-z_2 \\ x-x_3 & y-y_3 & z-z_3 \end{vmatrix} = 0 \quad (5)$$

Since point four is also on this plane, the values at point four can be calculated through extrapolation using equation (6):

$$\begin{vmatrix} x_4-x_1 & y_4-y_1 & z_4-z_1 \\ x_4-x_2 & y_4-y_2 & z_4-z_2 \\ x_4-x_3 & y_4-y_3 & z_4-z_3 \end{vmatrix} = 0. \quad (6)$$

In equation (6), $z_4$ can be calculated using equation (7). $z_4$ could be the horizontal or vertical velocity.

$$z_4 = \frac{z_1 A - z_2 B + z_3 C}{A - B + C}, \quad (7)$$

where, $$A = \begin{vmatrix} x_4-x_2 & y_4-y_2 \\ x_4-x_3 & y_4-y_3 \end{vmatrix},$$

$$B = \begin{vmatrix} x_4-x_1 & y_4-y_1 \\ x_4-x_3 & y_4-y_3 \end{vmatrix},$$

$$C = \begin{vmatrix} x_4-x_1 & y_4-y_1 \\ x_4-x_2 & y_4-y_2 \end{vmatrix}.$$

After extrapolating the velocity field, momentum equations are solved to obtain an intermediate velocity field. The intermediate velocity field is extrapolated, using the method of extrapolation described above, to grid locations near but outside the deformable boundary.

Solving of the flow equations also requires solving the pressure Poisson equation derived from the incompressibility condition of the fluid, and simultaneously enforcing the pressure jump boundary condition along the free surface using a finite element approach. The Poisson equation (8):

$$\nabla^2 p = \frac{\rho}{\Delta t} \nabla \cdot u^* \quad (8)$$

$$u^* = \left(1 + \frac{\Delta t}{\rho} \mu \nabla^2\right) u$$

can be solved for the pressure of the fluid 101 while enforcing an incompressibility condition of the fluid 101 and a boundary condition that is at least partially in motion. In equation (8) p is the pressure, ρ is the density, Δt is the time step, and ū* is the intermediate velocity vector. Also in equation (8) ū is the velocity vector and μ is the viscosity of the fluid 101.

As the boundary 102 deforms so do the marker positions. The markers may bunch up or spread out depending on the non-uniformity of the motion associated with the boundary 102. New markers may be generated to keep the distance between markers within a given range (e.g. 0.2-0.8 times the cell size) or depending on the curvature of the boundary 102. The new marker positions may be used in the next time step.

The boundary 102, which is in motion, is represented explicitly by markers, which sit on the surface of the boundary 102. These markers are not tied to a specific point in space, instead they move with the boundary 102 as the boundary 102 is moved by the local velocity of the fluid 101, so do the markers.

The position of the boundary 102 is tracked explicitly in the time domain thus placing the present invention in the category of "front tracking" fluid flow simulation methods. Which should be distinguished from "front capturing" methods, such as the level set approach, in which the boundary is implied by the zero value contour of a level set function. Prior art methods have used front tracking methods to solve multiphase fluid flow problems. In the past, front tracking methods have not been used to solve single-phase fluid flow problems. Front tracking methods were not used because a methodology did not exist to effectively enforce the boundary conditions, whereas, front capturing methods have problems conserving the mass of the fluid. The present invention conserves the mass of the fluid better than front capturing methods. The present embodiments address this drawback of the front tracking method when applied to single-phase problems.

Along the boundary 102, curvature related boundary conditions often play an important role in determining local velocities of the fluid 101. For example, when attempting to calculate the flow of a fluid 101, the stress the fluid 101 experiences at the boundary 102 must meet certain conditions. An example of such a condition may include balancing the normal stress using the following equation (9).

$$[p - n_i \tau_{ij} n_j] = \sigma \kappa \quad (9)$$

In equation (9) the quantities in the square brackets [ ] represent a pressure jump condition across the moving boundary 102. The pressure jump is defined as a difference between a pressure on a point immediately inside the boundary and immediately outside the boundary. The difference in pressure is caused by the surface tension on the boundary. Further, due to difference in curvature, the pressure immediately inside the boundary 102 is not the same at different points inside the boundary 102. The symbol p is representative of the pressure, the symbol $\tau_{ij}$ is representative of the stress tensor, the symbols $n_i$ and $n_j$ are representative of the unit normal vector at the surface, σ is the surface tension coefficient of the fluid 101, and κ is the local surface curvature. Enforcing curvature related boundary conditions can cause instabilities to occur in a numerical method because the curvature is related to the second derivative of the positions of the markers. In the prior art the curvature had been calculated based on the second derivative of a line fitted to the markers.

In order to simplify the following discussion of the hybrid method, the stress term in equation (9) is ignored in the following discussion. Hence, the boundary condition becomes equation (10).

$$[p] = \sigma \kappa \quad (10)$$

An individual skilled in the art would appreciate that the stress term from equation (9) may be included in the present invention without going beyond the spirit and scope of the present invention as recited in the claims.

Figure 4A:
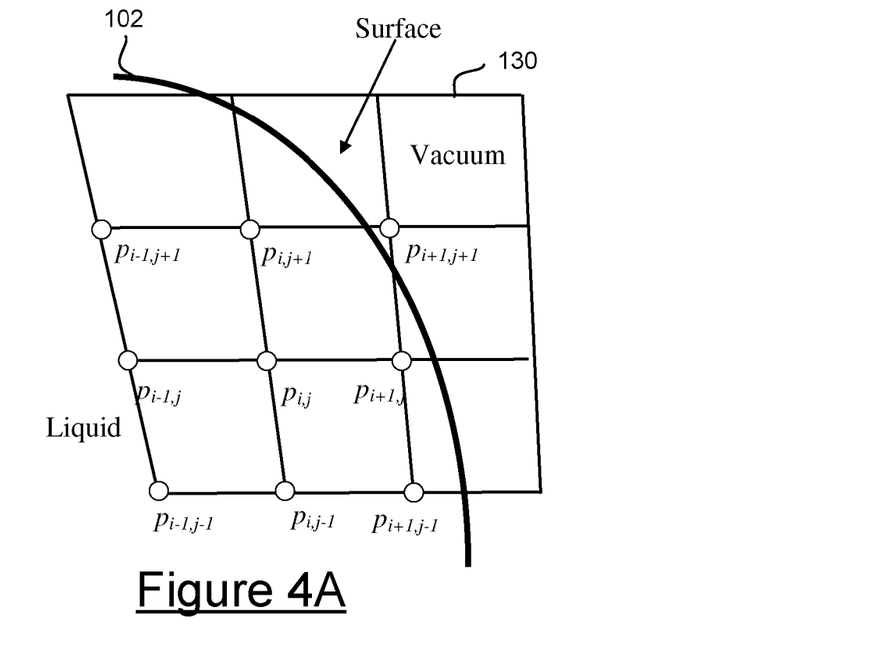
FIG. 4A illustrates an exemplary quadrilateral grid of computational cells in which the pressure is evaluated at the center of each computational cell, in accordance with one embodiment of the present invention.

When the Poisson equation is solved for the pressure p, the pressure p may be evaluated at the grid points (i.e., corners of each cell) of the computational cell as shown in FIG. 4A. The discrete pressure value at a point when the point is located outside the fluid domain enclosed by the surface or boundary 102, is determined by the boundary condition, equation (10).

As illustrated in FIG. 4A in two space dimensions, in the discrete Poisson equation, $p_{i+1,j+1}$ is set to $p_0+\sigma\kappa$ (this value comes from the boundary condition equation (10) with the stress neglected), where $p_0$ is the pressure outside the fluid domain (or boundary). Next, the pressure is extrapolated to get a pressure at a point outside the surface 102 by solving the Poisson equation (3) derived by incompressibility using a finite element approach, equation (11).

$$\int_\Omega \frac{\Delta t}{\rho} \nabla p \cdot \nabla \Psi dx = \int_\Omega u^* \cdot \nabla \Psi dx \qquad (11)$$

Then, to get the pressure at a marker through extrapolation, a discretized Poisson equation (12) is solved for cells of the computational domain.

$$\int_{-1}^{1}\int_{-1}^{1}\frac{\Delta t}{J\rho}\left[\sum_{l=1}^{4}\hat{p}_l(N_{l,\xi}\ N_{l,\eta})\begin{pmatrix} y_\eta & -x_\eta \\ -y_\xi & x_\xi \end{pmatrix}\right]\cdot$$

$$\left[\sum_{k=1}^{4}\hat{\Psi}_k(N_{k,\xi}\ N_{k,\eta})\begin{pmatrix} y_\eta & -x_\eta \\ -y_\xi & x_\xi \end{pmatrix}\right]d\xi d\eta = \qquad (12)$$

$$\int_{-1}^{1}\int_{-1}^{1}(u^*\ v^*)\cdot\sum_{k=1}^{4}\hat{\Psi}_k(N_{k,\xi}\ N_{k,\eta})\begin{pmatrix} y_\eta & -x_\eta \\ -y_\xi & x_\xi \end{pmatrix}d\xi d\eta$$

where u* and v* are the intermediate fluid velocities that were calculated previously, $\rho$ is the fluid density, and $\Delta t$ the time step size. If more than one neighboring locations are "out of phase", for each out-of-phase location, $\hat{p}_l$, we enforce $\hat{p}_l=\sigma\kappa$ and move the corresponding terms to the right hand side of the linear equations.

As mentioned earlier, the pressure at various points inside the surface 102 is different due to the surface curvature. The local curvature is a measure of the deviation of the fluid boundary 102 from a straight line. Given a boundary 102, there is a normal vector $\vec{n}$ on the boundary 102 that is perpendicular to the boundary. To measure the deviation of the boundary one can take the differential of the normal vector $\vec{\nabla}\cdot\vec{n}$ along the boundary 102. To calculate the curvature $\kappa$ of the surface 102, first, the marker positions are utilized to generate a signed distance function, $\phi$, over the whole domain or over a narrow band around the surface 102. Since the marker positions at a particular time step are known, the value of signed distance function, $\phi$, can be evaluated at any point inside the computational domain and in a narrow band around the surface 102.

As indicated earlier, the marker positions are used to represent the boundary 102. These marker positions are also used to generate a signed distance function $\phi$. The signed distance function $\phi$ may be evaluated over the whole domain or over a narrow band around the boundary 102. The signed distance function may be virtually extended into the region of space on both sides of the fixed boundary 104. Two markers which represent the boundary 102 closest to the fixed boundary 104 may be used to linearly extend the boundary 102 and create a virtual boundary 104. Instead of using the marker positions to generate the normal vector, the signed distance function may be used as in equation (13):

$$\vec{n} = \frac{\vec{\nabla}\phi}{|\vec{\nabla}\phi|} \qquad (13)$$

Since the value of $\phi$ can be evaluated at the corner points of each cell, the curvature value for each cell is used to approximate the average curvature along the surface 102 in the cell. This is a zero$^{th}$ order approximation. In this way, even the markers on the surface moving close to each other as the surface evolves, the curvature term remains relatively smooth.

Next, $\phi$ is used to calculate the curvature value at the cell corners. This calculation is performed by employing the centered difference scheme. Since the curvature, $$\kappa = \nabla\cdot\frac{\nabla\phi}{|\nabla\phi|} = \frac{1}{J}\nabla_\Xi\cdot\left(T\frac{T^T\nabla_\Xi\phi}{|T^T\nabla_\Xi\phi|}\right), \qquad (14)$$

is defined at the same location as the grid point, the curvature at point (i,j) can be calculated using equation (15).

$$\kappa_{i,j} = \left[\nabla_\Xi\cdot\left(T\frac{T^T\nabla_\Xi\phi}{|T^T\nabla_\Xi\phi|}\right)\right]_{i,j} = K_{i+\frac{1}{2},j} - K_{i-\frac{1}{2},j} + K_{i,j+\frac{1}{2}} - K_{i,j-\frac{1}{2}}, \qquad (15)$$

where, $$K_{i+\frac{1}{2},j} = \left(T\frac{T^T\nabla_\Xi\phi}{|T^T\nabla_\Xi\phi|}\right)_{i+\frac{1}{2},j} = T_{i+\frac{1}{2},j}\frac{T^T_{i+\frac{1}{2},j}(\nabla_\Xi\phi)_{i+\frac{1}{2},j}}{\left|T^T_{i+\frac{1}{2},j}\nabla_\Xi\phi\right|}$$

$$T_{i+\frac{1}{2},j} = \frac{1}{2}(T_{i,j}+T_{i,j-1})$$

$$(\nabla_\Xi\phi)_{i+\frac{1}{2},j} = \begin{pmatrix} \frac{1}{2}(\phi_{i+1,j}-\phi_{i-1,j}+\phi_{i+1,j-1}-\phi_{i-1,j-1}) \\ \phi_{i,j}-\phi_{i,j-1} \end{pmatrix}.$$

Similarly the forms for $$K_{i-\frac{1}{2},j}, K_{i,j+\frac{1}{2}}, \text{ and } K_{i,j-\frac{1}{2}}$$

can be derived.

An individual skilled in the art will appreciate that this may be expanded to three dimensions or other coordinate systems without going beyond the scope of the present invention as recited in the claims.

Equation (15) can be used to calculate a curvature value $\kappa_{i,j}$ at the center of a computational cell. This may be done by approximating the derivatives of the signed distance function using the centered difference method. Other difference methods may be used without going beyond the scope of the invention. This curvature value $\kappa_{i,j}$ is an approximation of the averaged curvature of the fluid boundary in the cell or near the cell.

Figure 4B:
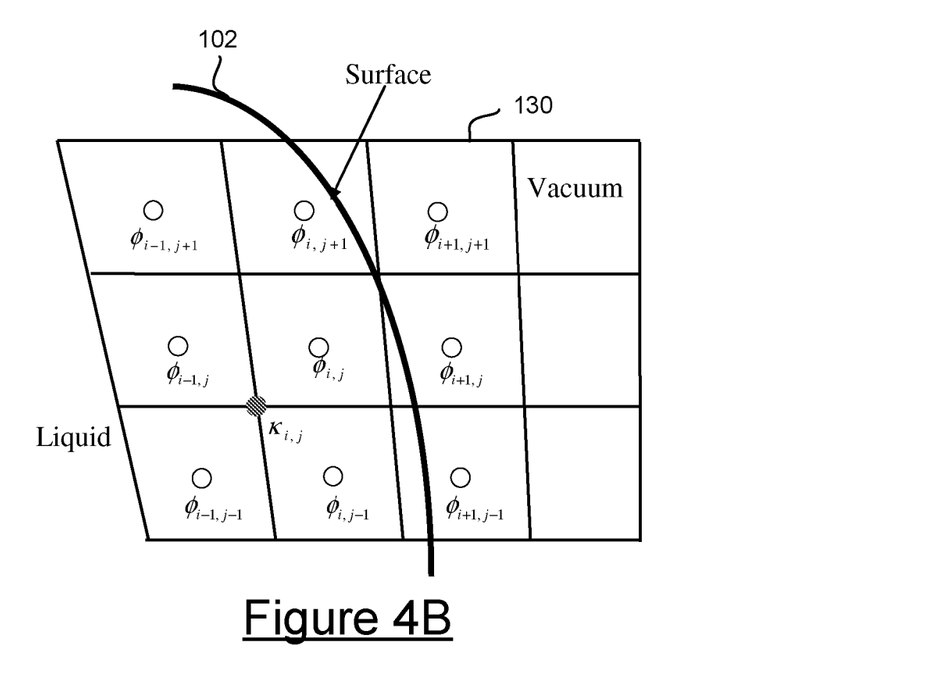
FIG. 4B illustrates an exemplary quadrilateral grid for calculating curvatures using a level set method, in accordance with one embodiment of the present invention.

FIG. 4B is an illustration of the discretized signed distance function $\phi_{i,j}$ along with the boundary 102. As shown in FIG. 4B the discretized signed distance function $\phi_{i,j}$ is evaluated at the cell centers. In one embodiment, if $(x,y)_{i,j}$, $(x,y)_{i+1,j}$, $(x,y)_{i,j+1}$, $(x,y)_{i+1,j+1}$ are the coordinates of the four corners, the cell center's coordinate is $(x,y)_c$ can be calculated using the following equation:

$$(x, y)_c = \frac{1}{4}((x, y)_{i,j} + (x, y)_{i+1,j} + (x, y)_{i,j+1} + (x, y)_{i+1,j+1})$$

Figure 5:
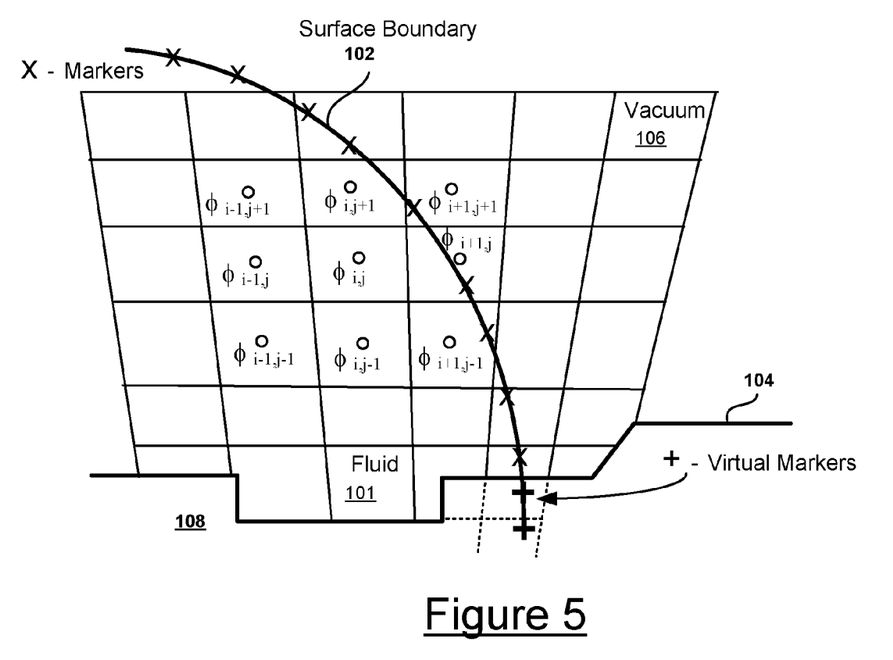
FIG. 5 illustrates an exemplary quadrilateral grid, the fluid markers, the fixed boundary, the deformable boundary, and the virtual boundary, in accordance with one embodiment of the present invention.

FIG. 5 is an illustration of the boundary 102 represented by a series of markers. FIG. 5 also show virtual markers below the fixed boundary 104. The virtual markers are extended below the fixed boundary 104 by linearly extending the boundary 102 from the fluid side of boundary 104 to the non-fluid side of the boundary. Virtual level set values are calculated relative to the virtual markers.

Figure 6:
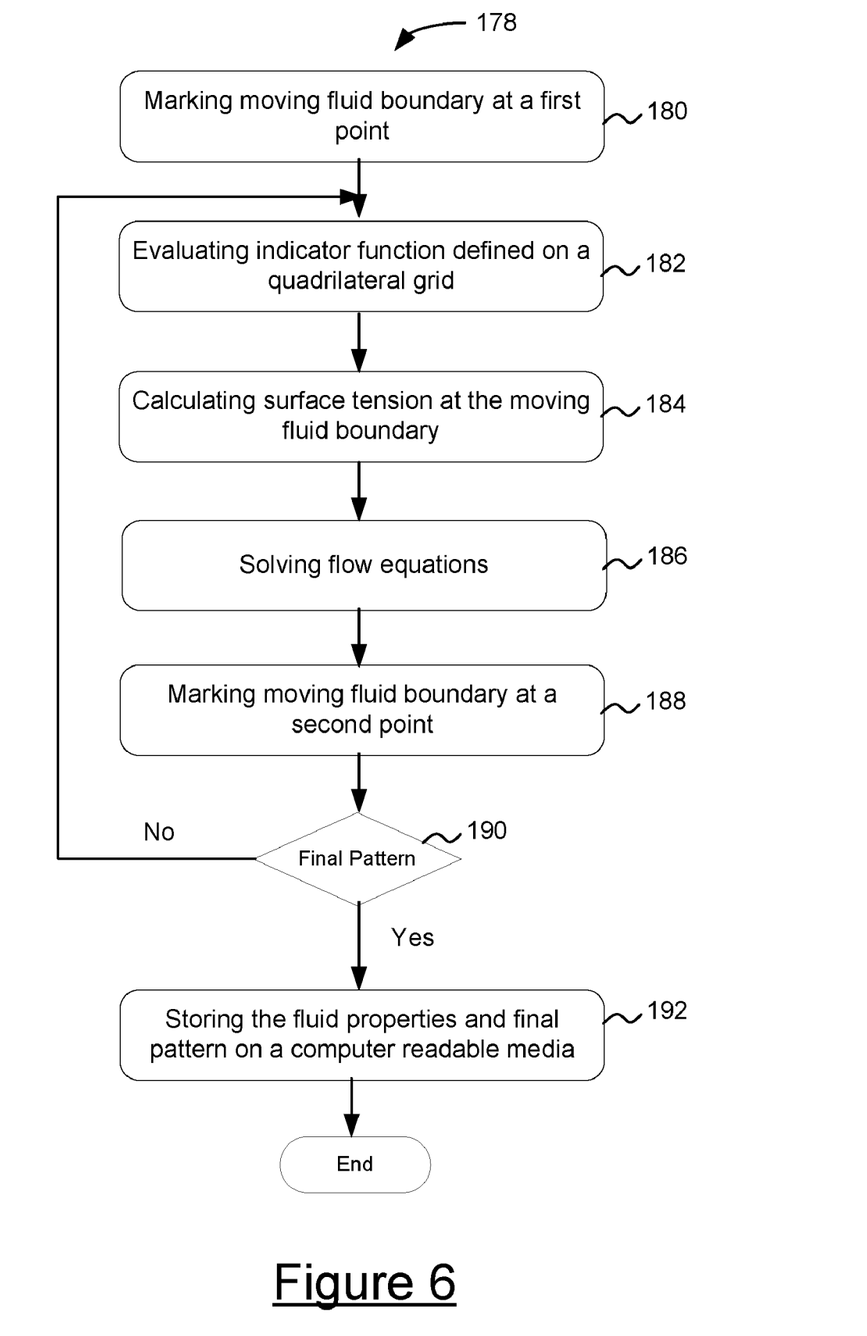
FIG. 6 illustrates a control flow of the process of simulating a final pattern of a droplet, in accordance with one embodiment of the present invention.

FIG. 6 is an overview of a method for implementing one embodiment of the present invention. This method may be implemented in hardware, software or a combination of both. The method is used to simulate the single-phase fluid 101 as illustrated in FIG. 2.

The single-phase fluid forms at least one boundary with its environment. This boundary is movable in one embodiment. The single-phase fluid may also form a second stationary boundary. In operation 180, the moving fluid boundary is marked with a set of markers at a first point in time. Each marker consists of a set of coordinates, which describe the position of a point on the boundary at a particular time. The coordinates may be in one, two, three, or more dimensions. The coordinate system may be Cartesian, polar, cylindrical or some other coordinate system.

Next, in operation 182 an indicator function defined on a quadrilateral grid for velocity field, pressure, and the marker points, is evaluated. The boundary is an N−1 dimensional surface that moves through an N dimensional space. The boundary divides the N dimensional space into two groups (a positive space and a negative space). The negative space may be the single-phase fluid or the vacuum or vice versa. The indicator function or the signed distance function may be a smooth continuous function, which is defined throughout the N dimensional space. The signed distance function has a positive value in the positive space and a negative value in the negative space. The absolute value of the signed distance function at a particular point in the N dimensional space is equal to the shortest distance from the particular point to the moving boundary 102. This statement is also true for all points in the N dimensional space.

The discrete number of points that represent the signed distance function may be distributed on a first grid. The first grid may coincide with portions of a second grid upon which values representative of the pressure of the liquid are calculated. The first grid may cover only a portion of the N dimensional space. The first grid may be limited to grid cells, which are one, two, three, or four grid cells from the deformable boundary based upon the order of the approximations used throughout the method 178.

Next, in operation 184, the surface tension at the deformable or moving boundary is calculated. The surface tension is calculated using a level set method, which is a well known method (hence, details are being omitted). Next, in operation 186, flow equations are solved for current surface location. Solving the flow equations includes (a) extrapolating the velocity field at time step n to grid locations near but outside the boundary (i.e., immediately outside the boundary). The solving of the flow equations further includes projecting the momentum equations to obtain an intermediate velocity field and extrapolating the intermediate velocity field to grid locations near but outside the boundary. The pressure Poisson equation derived from the incompressibility condition of the fluid is then solved. A pressure jump boundary condition along the free surface is simultaneously enforced using a finite element approach. The curvature of the surface is also calculated in the process of calculating the pressure jump. The solving of the flow equations further includes calculating new velocity, through process of interpolation, at the next time step n+1 using the pressure obtained by deriving the Poisson equation. This new velocity field is extrapolated at time step n+1 to grid locations near but outside the surface.

Next, in operation 188 the fluid boundary is marked at a second point in time. The free surface is moved with the velocity field at time step n+1. Then, in operation 190, a determination whether a final pattern of the droplet has evolved is made. If the final pattern has been evolved, the fluid properties and final pattern of the droplet is stored on a computer readable media. Else, the process is repeated by moving the control to operation 182.

Figure 7:
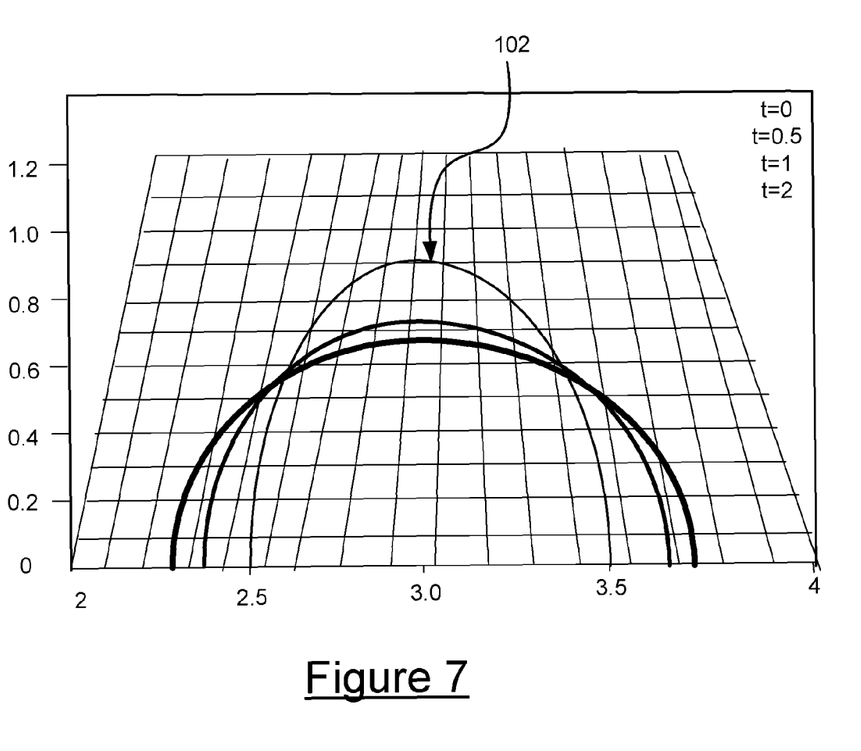
FIG. 7 illustrates an evolution of a droplet by surface tension, in accordance with one embodiment of the present invention.

Moving now to FIG. 7, the movement of the fluid boundary for an exemplary set of values of surface tension and viscosity of the liquid is illustrated. FIG. 7 illustrates the deformable boundary at three points in time. An initially deformed drop is driven by surface tension. Initially the drop assumes an elliptic shape with a larger height than width. The surface tension, in this example, is set to 1 (i.e., σ=1). The viscosity of the liquid is also set to 1 (i.e., μ=1). The density, in this example, is set to 1 (i.e., ρ=1). Further, in this example, full slip boundary condition is enforced at the bottom boundary. As apparent from FIG. 7, the elliptic drop spreads with time, and gradually moves toward the steady state which is a half circle.

System

Figure 8:
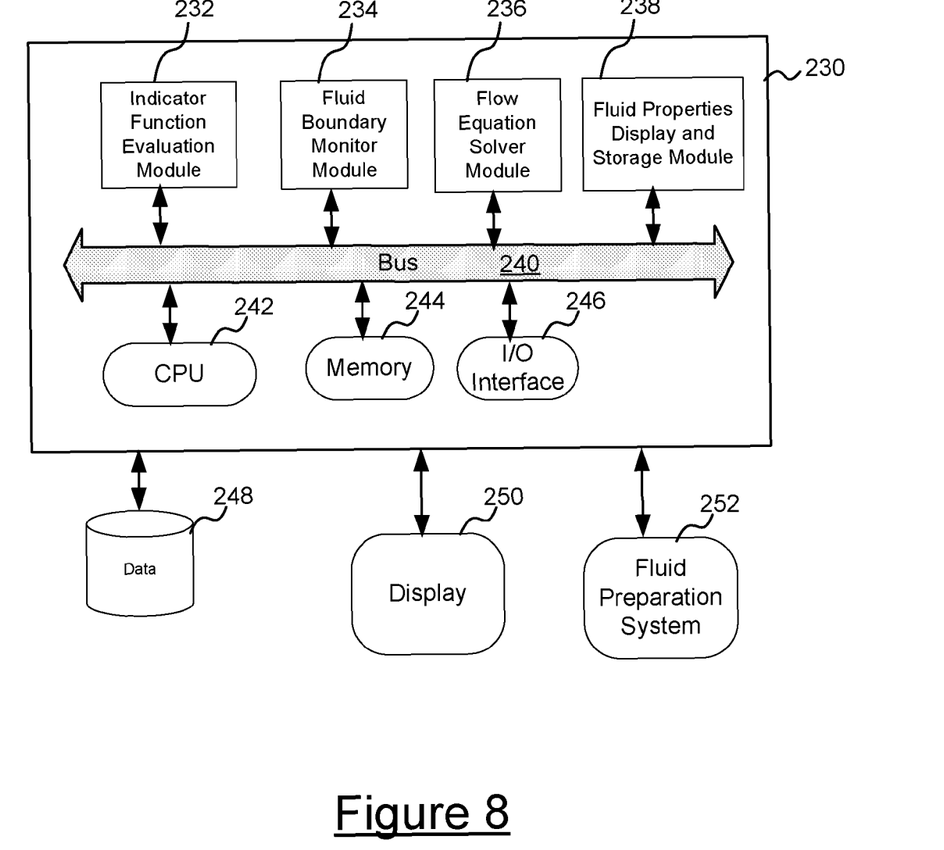
FIG. 8 illustrates a system for simulating a final pattern of a droplet, in accordance with one embodiment of the present invention.

Having described the details of the embodiments of the present invention, an exemplary system 230, which may be used to implement one or more aspects of the present invention, will now be described with reference to FIG. 8. As illustrated in FIG. 8, the system includes a processor 242 that provides computing resources and controls the computer. The processor (or CPU) 242 may be implemented with a microprocessor or the like, and may also include a graphics processor and/or a floating point coprocessor for mathematical computations. The system 230 also includes memory 244 which may be in the form of random-access memory (RAM) and read-only memory (ROM). The system 230 may also include an I/O interface 246 to enable data input/output operations as well as interfacing with a fluid preparation system 252. The I/O interface 246 also provides interface to one or more sensors to input data such as pressure, temperature, viscosity, etc. The fluid preparation system 252 may receive simulation data from the system 230 to enable the fluid preparation system 252 to adjust fluid properties of the fluid that is to be used in the inkjet printing.

The system 230 further includes an indicator function evaluation module 232 to provide computational functionality for solving an indicator function defined on a quadrilateral grid for a velocity field, a pressure, and the marker points. A fluid boundary monitor module is also included to monitor and mark the deformable fluid boundary at different points of time. Further, a flow equation solver module 236 is provided to solve flow equations as described in the description of FIG. 6 and in detailed discussion in the previous paragraphs. A fluid properties display and storage module 238 is provided to display the fluid properties to a user or to store various fluid properties and simulation data in a computer readable media.

In one embodiment, all modules that are parts of the system 230 are coupled together through an internal bus 240.

A number of controllers and peripheral devices may also be provided, as shown in FIG. 8. The system 230 may also include an external storage media 248 for storing and/or transferring simulation data. A display 250 is also provided to enable display of simulation data and patterns including the final pattern of the droplet, as well as fluid properties of the fluid. The computer readable media such as magnetic tape or disk, or an optical medium can be used to record programs of instructions for operating systems, utilities and applications which may include embodiments of programs that implement various aspects of the present invention.

In the illustrated system, all major system components can connect to a bus 240, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, any "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

It should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A computer implemented method for simulating a final pattern of a droplet of a fluid having a plurality of fluid properties, comprising:
    (a) representing a position of a moving fluid boundary at a first point in time with a plurality of fluid markers, wherein the moving fluid boundary provides a boundary for a single-phase fluid, the moving fluid boundary separates a simulation space into a fluid space and a vacuum space, and the single-phase fluid inhabits the fluid space;
    (b) evaluating a plurality of indicator functions defined on a quadrilateral grid for a velocity field, a pressure, and the plurality of fluid markers, the quadrilateral grid being formed by a plurality of points inside the fluid space and the vacuum space;
    (c) calculating surface tension at the moving fluid boundary through a level set method;
    (d) solving a plurality of flow equations through a projection method;
    (e) representing the position of the moving fluid boundary at a second point in time by updating the positions of the fluid markers based on the plurality of velocity values; and
    (f) storing the plurality of fluid properties and a shape of the final pattern on a computer readable media.

2. The method as recited in claim 1, wherein solving the plurality of flow equations further includes extrapolating the velocity field to grid locations at a second plurality of points, the second plurality of points being proximate to the plurality of fluid markers and do not coincide with the moving fluid boundary.

3. The method as recited in claim 2, wherein solving the plurality of flow equations further includes evaluating a plurality of momentum equations to obtain an intermediate velocity field.

4. The method as recited in claim 3, wherein solving the plurality of flow equations further includes extrapolating the intermediate velocity field to the second plurality of points.

5. The method as recited in claim 4, wherein solving the plurality of flow equations further includes calculating a pressure at the moving fluid boundary through an evaluation of a pressure Poisson equation derived from an incompressibility condition of the single-phase fluid, wherein a pressure inside the moving fluid boundary is different than a pressure outside the moving fluid boundary, a difference in the pressure inside the moving fluid boundary and the pressure outside the moving fluid boundary represents a pressure jump boundary condition.

6. The method as recited in claim 5, wherein solving the plurality of flow equations further includes applying the pressure jump boundary condition along a surface of the single-phase fluid through a finite element approach.

7. The method of claim 1, wherein the extrapolating the velocity field to a center of a first grid cell of the quadrilateral grid comprises using a velocity in a center of a second grid cell that is immediately below the first grid cell, the center of the first grid cell being in the non fluid space and the center of the second grid being in the fluid space.

8. The method of claim 1, wherein the extrapolating the velocity field to a center of a first grid cell of the quadrilateral grid comprises evaluating a plane passing through a center of a second grid cell, a center of a third grid cell, and a center of a fourth grid cell, wherein the second grid, the third grid, and the fourth grid being adjacent to the first grid, and the center of the first grid cell being in the non fluid space, the center of the second grid, the center of the third grid, and the center of the fourth grid being in the fluid space.

9. The method of claim 1, wherein the calculating of the pressure comprises evaluating the pressure at a plurality of grid points of a plurality of grid cells that are inside the fluid domain, wherein a corner of a grid cell represents one of the plurality grid points.

10. The method of claim 9, wherein the calculating the pressure further comprises evaluating a plurality of curvature values of the surface if one of the plurality of grid points being evaluated is in the vacuum space.

11. The method of claim 1 wherein the single-phase fluid is bounded by a moving boundary and a fixed boundary.

12. The method of claim 1, wherein after the plurality of fluid markers are updated at a second point in time the positions of the plurality of fluid markers are recalculated, while substantially maintaining the shape of the moving fluid boundary and adjusting a relative distance between individual markers such that the relative distance remains within a specified range.

13. The method as recited in claim 1, further including adjusting the plurality of fluid properties of the single-phase fluid and repeating (a) to (e) until a desired final pattern of the droplet is obtained.

14. A system for simulating a final pattern of a droplet of a fluid, comprising:
a computer readable media to provide storage for programming instructions, the programming instructions including programming instructions to implement an indicator function evaluation module, a fluid boundary monitor module, a flow equation solver module, and a fluid properties display and storage module;
a processor coupled to the computer readable media to execute the programming instructions; and
a display to plot the final pattern of the droplet and a plurality of fluid properties of the fluid,
wherein, the fluid boundary monitor module marks a moving fluid boundary of the droplet, the indicator function evaluation module solves a plurality of indicator functions defined on a quadrilateral grid for a velocity field, a pressure, and the plurality of fluid markers, and the flow equation solver module solves a plurality of flow equations through a projection method for a surface location on a fluid boundary of the droplet.

15. The system as recited in claim 14, further includes an I/O interface to a fluid preparation system, the fluid preparation system uses the fluid properties to prepare the fluid for inkjet applications.

16. The system as recited in claim 14, further includes an I/O interface to provide interface to at least one of a pressure sensor, a temperature sensor, and a viscosity sensor.

17. A computer readable media having program instructions for simulating a final pattern of a droplet of a fluid having a plurality of fluid properties, the computer readable media comprising:
program instructions for representing a position of a moving fluid boundary at a first point in time with a plurality of fluid markers, wherein the moving fluid boundary provides a boundary for a single-phase fluid, the moving fluid boundary separates a simulation space into a fluid space and a vacuum space, and the single-phase fluid inhabits the fluid space;
program instructions for evaluating a plurality of indicator function defined on a quadrilateral grid for a velocity field, a pressure, and the plurality of fluid markers, the quadrilateral grid being formed by a plurality of points inside the fluid space and the vacuum space;
program instructions for calculating surface tension at the moving fluid boundary through a level set method;
program instructions for solving a plurality of flow equations through a projection method;
program instructions for representing the position of the moving fluid boundary at a second point in time by updating the positions of the fluid markers based on the plurality of velocity values; and
program instructions for storing the plurality of fluid properties and a shape of the final pattern on a computer readable media.

18. The computer readable media as recited in claim 17, wherein the programming instructions for solving the plurality of flow equations further includes programming instructions for extrapolating the velocity field to grid locations at a second plurality of points, the second plurality of points being near the plurality of fluid markers and do not coincide with the moving fluid boundary.

19. The computer readable media as recited in claim 18, wherein the programming instructions for solving the plurality of flow equations further includes programming instructions for evaluating a plurality of momentum equations to obtain an intermediate velocity field.

20. The computer readable media as recited in claim 19, wherein the programming instructions for solving the plurality of flow equations further includes programming instructions for extrapolating the intermediate velocity field to the second plurality of points.

21. The computer readable media as recited in claim 20, wherein the programming instructions for solving the plurality of flow equations further includes programming instructions for calculating the pressure at the moving fluid boundary through an evaluation of a pressure Poisson equation derived from an incompressibility condition of the single-phase fluid, wherein the pressure inside the moving fluid boundary is different than the pressure outside the moving fluid boundary, a difference in the pressure inside the moving fluid boundary and the pressure outside the moving fluid boundary represents a pressure jump boundary condition.

* * * * *